(12) United States Patent
Ciampa (10) Patent No.: US 12,496,552 B2
(45) Date of Patent: Dec. 16, 2025

(54) BIOFILTRATION APPARATUS AND METHOD FOR THE TREATMENT OF GASES/VAPORS AND/OR COMBUSTION FLUE GASES

(71) Applicant: CENTRO DIAGNOSTICO BARONIA S.R.L., Frigento (IT)

(72) Inventor: Renato Ciampa, Avellino (IT)

(73) Assignee: CENTRO DIAGNOSTICO BARONIA S.R.L., Frigento (IT)

( * ) Notice: Subject to any disclaimer, the term of this patent is extended or adjusted under 35 U.S.C. 154(b) by 909 days.

(21) Appl. No.: 17/771,305

(22) PCT Filed: Nov. 11, 2020

(86) PCT No.: PCT/IT2020/050279
§ 371 (c)(1),
(2) Date: Apr. 22, 2022

(87) PCT Pub. No.: WO2021/095077
PCT Pub. Date: May 20, 2021

(65) Prior Publication Data
US 2022/0387932 A1 Dec. 8, 2022

(30) Foreign Application Priority Data
Nov. 15, 2019 (IT) .................. 102019000021282

(51) Int. Cl.
*B01D 53/85* (2006.01)
(52) U.S. Cl.
CPC .................. *B01D 53/85* (2013.01)

(58) Field of Classification Search
None
See application file for complete search history.

(56) References Cited

U.S. PATENT DOCUMENTS

2004/0152185 A1  8/2004 Egan et al.
2014/0322804 A1 10/2014 Boily et al.

FOREIGN PATENT DOCUMENTS

| | | | | |
|---|---|---|---|---|
| CN | 104310571 A | * | 1/2015 | ............ B01D 53/85 |
| CN | 108970386 A | * | 12/2018 | ............ B01D 53/32 |
| DE | 4307672 A1 | | 10/1993 | |
| DE | 202008009666 U1 | | 11/2008 | |
| KR | 100454424 B1 | * | 10/2004 | ............ B01D 53/75 |
| WO | 02089959 A1 | | 11/2002 | |
| WO | 2011042846 A1 | | 4/2011 | |
| WO | 2012129681 A1 | | 10/2012 | |

OTHER PUBLICATIONS

International Search Report for International Application No. PCT/IT2020/050279 mailed May 20, 2021.
Written Opinion for International Application No. PCT/IT2020/050279 mailed May 20, 2021.

* cited by examiner

*Primary Examiner* — William H. Beisner
(74) *Attorney, Agent, or Firm* — Perilla Knox & Hildebrandt LLP; Kenneth A. Knox (57) ABSTRACT

The invention concerns a method and the related apparatuses for carrying out the treatment of gases/vapors and/or combustion flue gases containing pollutants such as $NO_x$, $SO_2$, $CO$, $CO_2$, $O_3$, $CH$, $NH_3$, $H_2S$, $C_2H_6S$, VOC, dioxins, and other elements (including heavy metal particulates PM10 and PM2.5 and PM1).

20 Claims, 4 Drawing Sheets

BIOFILTRATION APPARATUS AND METHOD FOR THE TREATMENT OF GASES/VAPORS AND/OR COMBUSTION FLUE GASES

CROSS-REFERENCE TO RELATED APPLICATIONS

This application is a national phase application under 35 U.S.C. § 371 of International Application No. PCT/IT2020/050279 entitled "BIOFILTRATION-APPARATUS AND -METHOD FOR THE TREATMENT OF GASESNAPORS AND/OR COMBUSTION FLUE GASES," filed Nov. 11, 2020, which claims the benefit of and priority to Italian (IT) Patent Application No. 102019000021282, filed Nov. 15, 2019, the contents of both of which being incorporated by reference in their entireties herein.

BACKGROUND

Worldwide, environmental pollution is one of the most serious issues from the point of view of sustainability, since it is caused by a set of factors that are not easily controllable.

Usually, pollution is defined as the alteration of the normal state of the environment quality, which can often lead to the irreversible change of the physicochemical characteristics of an ecosystem and which can be caused by different factors, known as main pollutants (physical, chemical, and biological).

Once a certain concentration of pollutants and critical states have been exceeded, the environment is no longer able to reabsorb the excessive amount of harmful substances released and this inevitably alters its equilibrium.

The flue gases emitted by combustion vehicles, boilers, power plants, factories, industries, incineration plants, and other sources, natural or not, are emitted into the Earth's atmosphere as substances harmful and particularly noxious for the whole ecosystem.

The effects of air pollution are increasingly well known and tangible, especially in large metropolitan cities where smog represents a serious issue.

Worldwide, a quarter of premature deaths and diseases are related to pollution and environmental damages caused by humans, as it is also known that the pollutant emissions in the atmosphere consist of chemicals that contaminate drinkable water, thus accelerating both the destruction of fundamental ecosystems and the spread of global epidemics, which in turn damage and hinder the economy.

BRIEF SUMMARY

The present disclosure relates to a biofiltration apparatus and corresponding method for treating gases, vapors, and flue gases. The apparatus comprises a multi-layered septum of biofiltration substrate material, either biodegradable or non-biodegradable, water-resistant, electrically insulating, and arranged in vertical and horizontal bands, positioned between an inlet and outlet for the gaseous flow. The substrate is exposed to an electromagnetic field and is supported by a grid structure that integrates conductive components. Below the biofilter lies a process liquid container with pH regulation and liquid flow control, contributing to microbial habitat regulation. The system enables precise control of gas flow, temperature, and biological treatment conditions to effectively manage and reduce pollutants. The associated methods include initializing and activating the biofilter, controlling gas entry and exit, regulating microbial activity, and overseeing pollutant breakdown. The apparatus is adaptable for both flow directions, enhancing its utility in various environmental treatment applications.

BRIEF DESCRIPTION OF THE FIGURES

FIG. 3 shows a top view of a fixed installation of the biofiltration apparatus in a rectangular (parallelepiped) tank configuration according to various embodiments of the present disclosure.

DETAILED DESCRIPTION

The present disclosure provides a method for the abatement of pollutant emissions, and directly involves the ecological sector of environmental devices.

More precisely, such a method would allow reducing environmental pollution phenomena related to gas/vapors and/or flue gases, on one hand, avoiding the pollutants transfer to other liquids and/or solids and, on the other hand, transforming them into useful compounds for subsequent biological cycles.

Various embodiments are described herein for a new cleaning treatment of pollutants that can be absorbed by a microbial biofilm, starting a biofiltration process including appropriate multi-selective layers. Feedback controls actuators (integrated into the process itself) assist the process to guarantee the needed bacterial vitality and to act in real-time on all the operating parameters (such as pH, gases flow rate to be cleaned, contact time between pollutants and biofilm, moisture content, nutrient content, pressure drop, temperature, biomass increase/decrease curve), eventually with specific software.

As well known, standard air biofiltration is a cleaning treatment of gaseous emissions based on the biochemical oxidation of airborne polluting organic compounds, which are often odorous, carried out by microorganisms.

Considering the above-mentioned state of the art, the main technical problem faced by the present disclosure is increasing the field of application of the bio-filtering technique by including the abatement of pollutants from flue gases containing dioxins and/or powders and/or NOx and/or SO2 and/or CO2 and/or CO and/or HC and/or Volatile Organic Compounds (VOC) and/or other unburnt material. The disclosure can be applied stand-alone and/or integrated into series and/or parallel to traditional cleaning systems gases/vapors and/or flue gases with high or low pollutant concentration. Due to its easily accessible and economic materials, the disclosure aims at improving air quality at a global level.

However, the field of application of such method is even larger. Behind the treatment of flue gases containing VOCs, it can be extended to the sector of thermomechanical biotechnologies including energy, transportation (terrestrial, marine, aviation), and fire prevention.

As regards the energy sector, it provides a strategy to improve energy processes (including those based on fossil sources), using biomass no longer as a fuel but as a material (with a lower amount) to reduce harmful emissions of flue gases, including those from fossil fuels combustion.

This allows reducing CO2 emission into the atmosphere at the same time increasing carbon sequestration into the soil.

Therefore, any flue gas from fossil fuel treated with the proposed method will release the carbon stored in the subsoil as CO2 that is transferred to the biomass. In this way, carbon comes back to the above ground.

It will be possible, for example, to use the present method to degrade the flue gases containing pollutants and to carry out other applications in chimneys and/or flues and/or in special environmental devices, placed in the subsoil and/or on the buildings' roofs where thermal cycles occur, thus reducing atmospheric emissions (even over 90%) and making the related thermal cycle cleaned up if integrated with the biomass replacement process used for the above-mentioned abatement (more advantageously, due to the smaller quantity of biomass used, compared to the direct use of biomass as a fuel).

Applying the proposed method directly to combustion (of both biomass and fossil fuels) contributes to reaching the target of reducing CO2 into the atmosphere and its impact on global warming.

In the field of transport, it has to be considered that the disclosure needs a large space, which is not always available in mobility solutions. However, it can be advantageously employed in mobility solutions (implemented in containers, roll-off boxes, trailers, wagons, rafts, etc.) to be suitably connected to the mufflers of the exhausts of internal combustion engines of trucks, trains, and boats and/or in a fixed position, placing it for the forced aspiration in stopping places laterally to runways and/or roads and/or sidewalks and/or tracks and/or landing docks, and/or in general at critical stopping points of means of transportation equipped with thermal engines.

The disclosure is particularly useful to preserve urban areas where internal combustion engines are typically used at partial load (even minimum), due to start and stop phases. This can occur, as an example, when entering or exiting train stations, ports, airports, and/or during a generic stop (temporary or prolonged) where the engine running is needed for the auxiliary systems.

Differently, in the fire protection systems, beyond the reduction of the gases released into the atmosphere (preserving the external ecosystem from the gases released in the event of a fire and/or post-fire), the disclosure will be useful to control the actuators of smoke ejection thus obstructing the airflow to extinguish the flame.

The disclosure could be used, as an example, in the ejection systems of the exhaust air from buildings where activities and/or manufacturing that make the air unhealthy are carried out. By installing the disclosure in the ducts for the air ejection and/or in suitable environmental exiting devices, the external air may be preserved from the released pollutants.

Furthermore, the method can be used to treat gases, needed for an internal system, coming from an external environment polluted by dioxins and/or dust and/or VOC and/or NOx and/or SO2 and/or CO2 and/or CO and/or HC and/or other unburnt products (even in low concentration). The proposed solution could be used to purify contaminated atmospheric air by installing the system in the ducts for the air and/or vapor supply, in suitable healthcare devices, in areas to be preserved (including horticultural production greenhouses), and/or reducing Sick Building Syndrome (SBS).

Considering the above-mentioned aspects, for the sake of completeness, it is worth noticing that the field of application of the disclosure can be extended to the sectors of engineering and construction, urban planning, and architecture (in addition to the strategies of smart cities).

The concept that inspired the present disclosure is the exploitation of the degradative action of bacteria, which are the oldest known organisms. Indeed, on planet Earth, they date back to about 3.5 billion years ago. Due to the easy organization and the lack of competition with eukaryotes, they largely spread, adapting in all-natural ecosystems (soil, waters, atmosphere), as well as in particular environments such as flora and fauna (both outside and inside).

Bacteria are extremely specialized since once adapted to their particular environment they cannot live in other conditions, making space for other bacteria that can, on the other hand (otherwise) flourish when conditions are favorable to them.

Some bacteria can only live in the presence of oxygen are called aerobes. Others, called anaerobes, cannot live in the presence of oxygen. Finally, others can live both with and without oxygen and are called facultative anaerobes.

Considering the temperature, psychrophilic bacteria live only at temperatures below 20° C., mesophiles in the range of 20 45° C., thermophiles at temperatures above 45° C.

It should be noted that the bacteria, in addition to being sensitive to electromagnetic fields, can also condition the relative lines of force when they propagate in a dielectric material.

Indeed, based on their vitality and/or their degradative action, they particularly influence the characteristics of a determined electromagnetic field present in a certain region of space.

Therefore, one of the objectives of the present disclosure is to exploit the ability of differential measurement (e.g., by the difference of values read between small time intervals) of the electrical parameters of a system (with known and fixed geometric dimensions) structured in such a way as to act with its internal electromagnetic field on the actions of bacteria. This allows obtaining a specific interaction that can condition the biopurification process of the gases that pass through a multi-selective substrate affected by this electromagnetic field. As a consequence, biofiltration of flue gas is induced with a virtuous cycle that generates waste reusable from other natural cycles, and at the same time monitoring to supervise and condition the biological balance of the process is carried out.

Currently, flue gases have never been treated with a procedure similar to the one proposed based on biomass and bacteria.

Differently, the bacteria present in animal and/or vegetable biomass are usually eliminated with the well-known smoking process that consists of using combustion exhausts.

The simple biofiltration, based on the complex biological principle of the food chain of microorganisms with strategic and selective feeding, derives from the idea of using such microorganisms to swallow, digest and then transform the gaseous pollutants into reusable elements, establishing a controlled food chain.

They play a very important role as they determine the decomposition of organic matter, re-mineralizing the nutrients that are reused by autotrophic organisms.

Another objective of the disclosure is to manage the coexistence of all the types of bacteria described above, conditioning the state of nutritional balance and keeping the living conditions, artificially imposing changes to their habitat depending on the process requirements.

These and other purposes of the present disclosure are achieved by giving micro-currents to an electric capacitor suitable to enclose within its armatures the microbial culture developed in cultivation substrates (containing enzymatic compounds and both aerobic and anaerobic bacterial strains), to have a multiple selection barrier (in parallel and/or in series) of the pollutants (which are seen as nutrients to be assimilated).

As a further advantageous aspect of the present disclosure, the usage of the disclosure is unique if compared to similar devices, since the pollutants removed from the inlet gaseous flow are not transferred to other fluids or to the solid medium in which they pass, but are ecologically degraded into substances useful for the life cycle (through appropriate management of electrical stimuli) to support biological processes and bacterial vitality until the desired output parameters are reached.

The person skilled in the art can understand that the disclosure is susceptible to numerous modifications and variations that may be included in the innovative concept expressed in the attached claims.

All the details can be replaced by other technically equivalent elements, and the materials can be different depending on the requirements. However, these variations do not exclude from the protection of the present disclosure.

In the state of the art, there is no and there has never been suggested a device able to carry out the above-mentioned activities or similar to the one here proposed. Indeed, bio-filtering processes (supported by electro-stimulation) have never been considered for the treatment of flue gases and/or the polluting elements released by them, but only for that of air affected by odor problems or VOC at ambient temperatures (<50° C.)

Even if the object of the present disclosure has been described considering the attached figures, the reference numbers used in the description and the claims are only used to improve the understanding of the disclosure and do not constitute any limitation to the scope of claimed protection.

The present disclosure is described considering merely one example of a layout or implementation, but it will be understood that in practice other expedients and/or clarifications may be made with the evolution of technologies, variations, and modifications, without leaving the scope of protection of this disclosure.

Therefore, the person skilled in the art will understand that the disclosure can be subjected to numerous modifications and variations, which fall within the scope of protection defined by the attached claims, especially in terms of scalability. Indeed, the scale of the system will depend on the subjective/objective needs, or on the project variables, with the possibility of varying the characteristics due to commercial convenience, encouraging industries to give them colors, specific anatomical shapes, and/or suitable scale.

The disclosure refers to a method, and the related implementation equipment, for carrying out the treatment of gas/vapors and/or flue gases contaminated by pollutants such as NOx, SO2, CO, CO2, O3, CH, NH3, H2S, C2H6S, VOC, dioxins and other elements (including PM10 and PM2.5 particulates and heavy metal PMI), significantly reducing the environmental impact and management costs compared to current standard systems for the treatment of the aforementioned pollutants.

In particular, the disclosure is a method of biofiltration treatment of gaseous flows, that may be composed entirely of single pollutants with high or low concentration, suitably designed to reduce environmental pollution phenomena. The disclosure is based on the complex biological principle of the food chain of microorganisms with strategic and selective nutrition which, by swallowing and digesting, convert pollutants to make them reusable.

This initial setting phase (or initialization, called phase 0) is defined as "installation habitat start" and is completed with the appropriate placement of the substrate materials in the specifically prepared (also in terms of geometry and chemical-physical characteristics) treatment septa.

Once the adequate habitat of initial vitality has been obtained, it needs to recognize and/or adapt quickly to the parametric variations of survival due to the presence (in excess or deficit) of pollutants, to maintain the balance useful for the declared purpose.

To better understand the method of the disclosure, first, it is helpful to describe the structure and the materials needed to start the biological process, also considering the eventual configuration of self-diagnosis sensors and the needed electromagnetic stimulators and actuators (exempted for shape and composition from the present disclosure for non-limiting purposes).

Such control devices are integrated to reveal/preserve the state of the vitality of the microorganisms involved, and to set the treatment process of the gaseous substances sent to a biological reactor, which constitutes the core device whose process method is implemented.

Further characteristics and advantages of the disclosure will become more evident thanks to the following detailed description referring to as a specific and preferred configuration, which is not, however, unique plausible.

Such a configuration is illustrated, as an example, in the attached drawings.

The process, according to the configuration here presented, consists of the following parts represented in the following tables.

Figure 1:
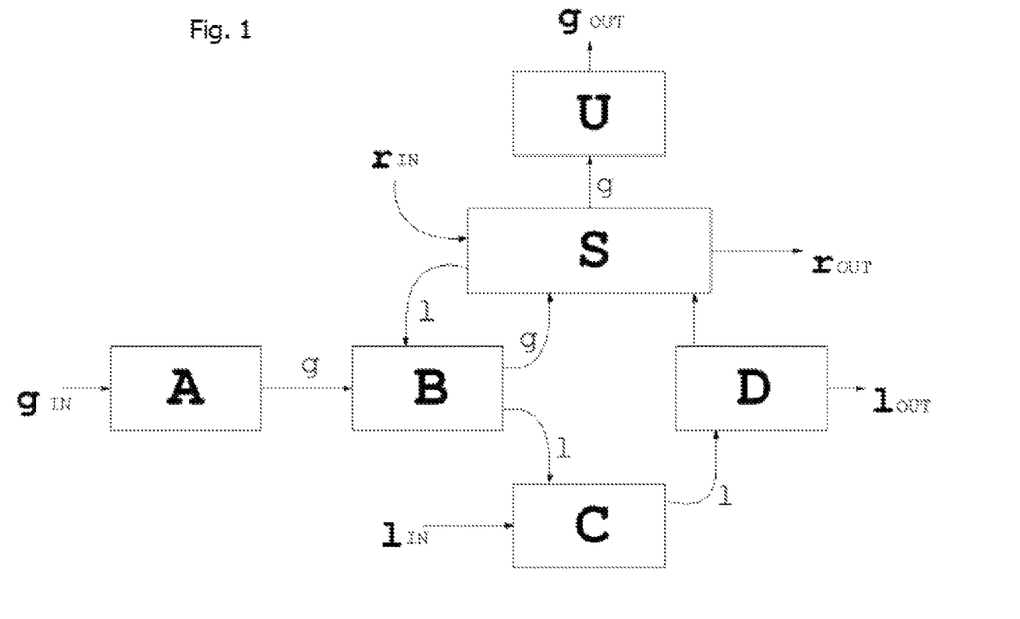
FIG. 1 is a flow chart illustrating an operational cycle of a biofiltration method according to various embodiments of the present disclosure.

The first group of drawings of Table 1 sketch the operational and functional concepts of the novel method the possible implementations will be based on; FIG. 1 sketches the operating cycle of the present disclosure (through a flow chart), and FIG. 2 sketches the functional cycle of the present disclosure (through an automata chart).

Figure 4:
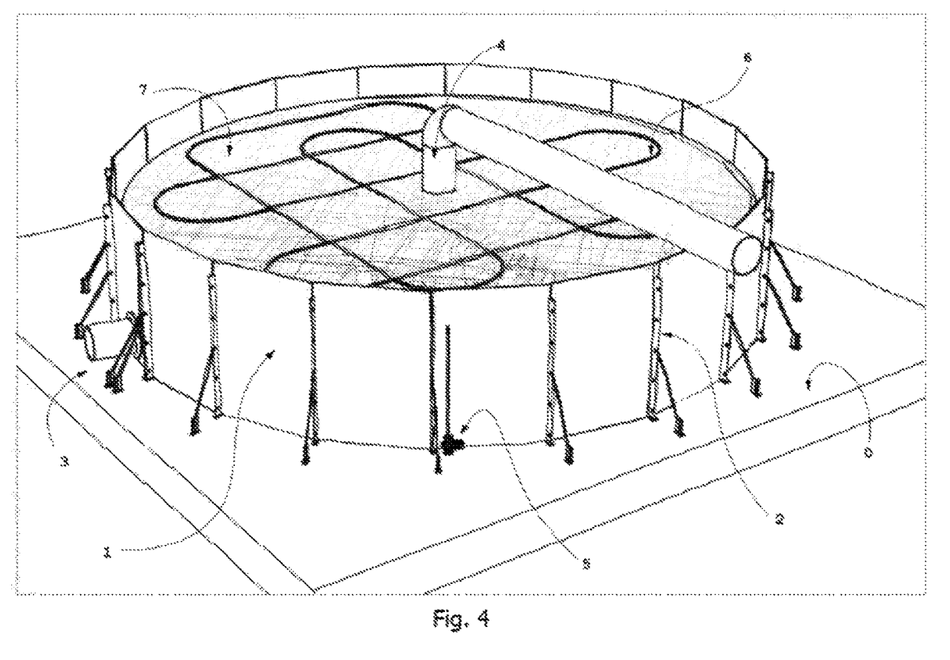
FIG. 4 illustrates a top view of an alternative circular tank configuration of the biofiltration apparatus according to various embodiments of the present disclosure.

The second group of drawings of Table 2 sketch a possible real configuration represented by a fixed set-up with a single multi-selective bio-filtering septum, which can be obtained through elements in parallel (i.e. placed side by side) for the surface enlargement. Such elements are characterized by the same height and they are placed in a parallelepiped or circular tank configuration, illustrated in FIG. 3 and FIG. 4, respectively. Such design proposes possible realizations of the disclosure, for putting it in a furniture flowerbed of a green area and/or for making easier the biofilter replacement.

Figure 5:
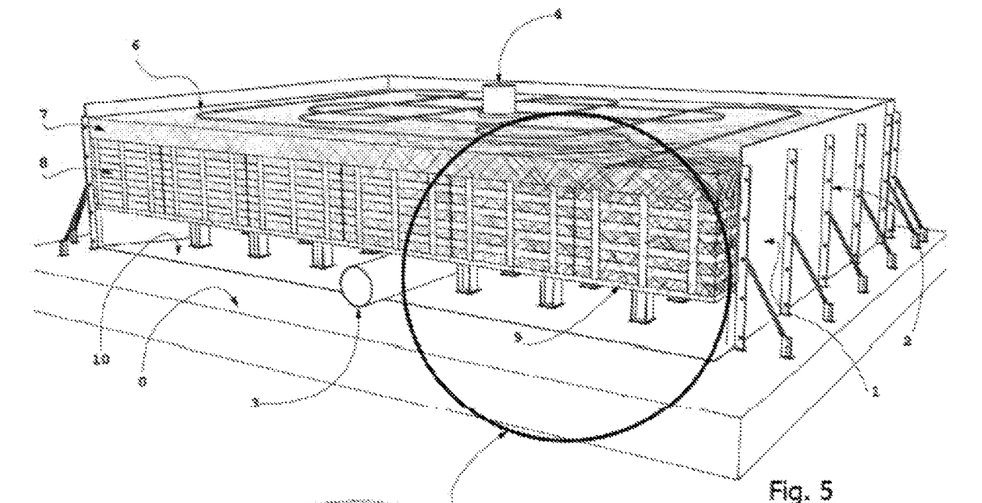
FIG. 5 provides a standard schematic view of the biofiltration septum (S), showing its placement between the gaseous inflow and outflow paths and its internal layered structure composed of biologically active substrate materials according to various embodiments of the present disclosure.
Figures 6, 7:
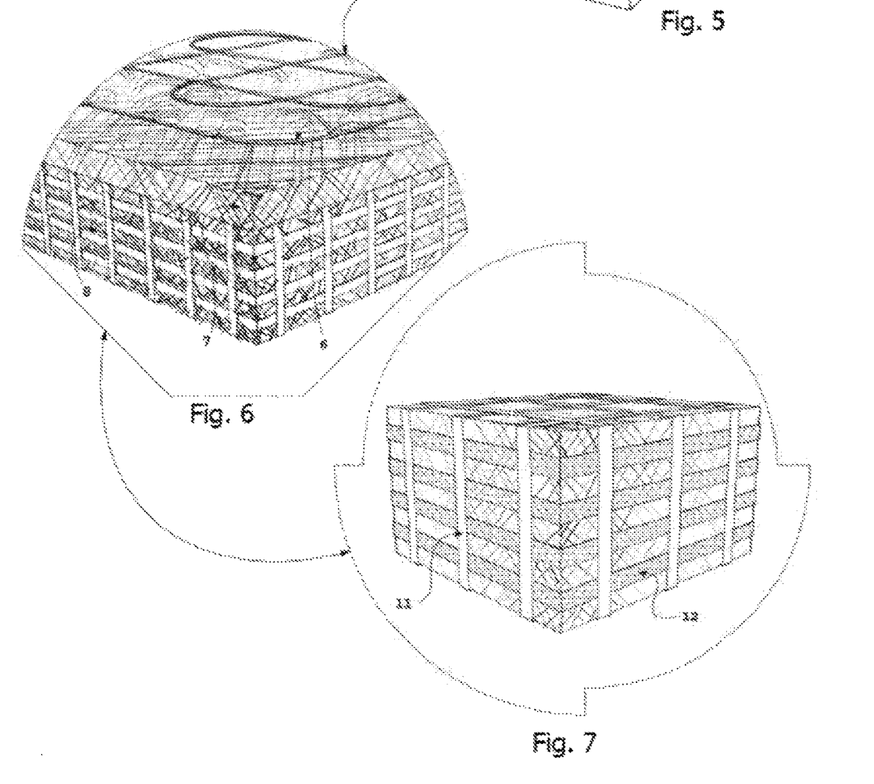
FIG. 6 presents a close-up sectional view of the septum structure, detailing the multi-layered substrate materials arranged with vertical and horizontal bands to control density and airflow distribution according to various embodiments of the present disclosure.
FIG. 7 offers an enlarged view focusing on the banding system and material texture of the biofiltration septum according to various embodiments of the present disclosure.

The third group of drawings of Table 3 sketches said biofiltration substrate septum in detail, in a standard view in FIG. 5 and a closer view in FIG. 6 and FIG. 7.

Figures 8, 9, 10:
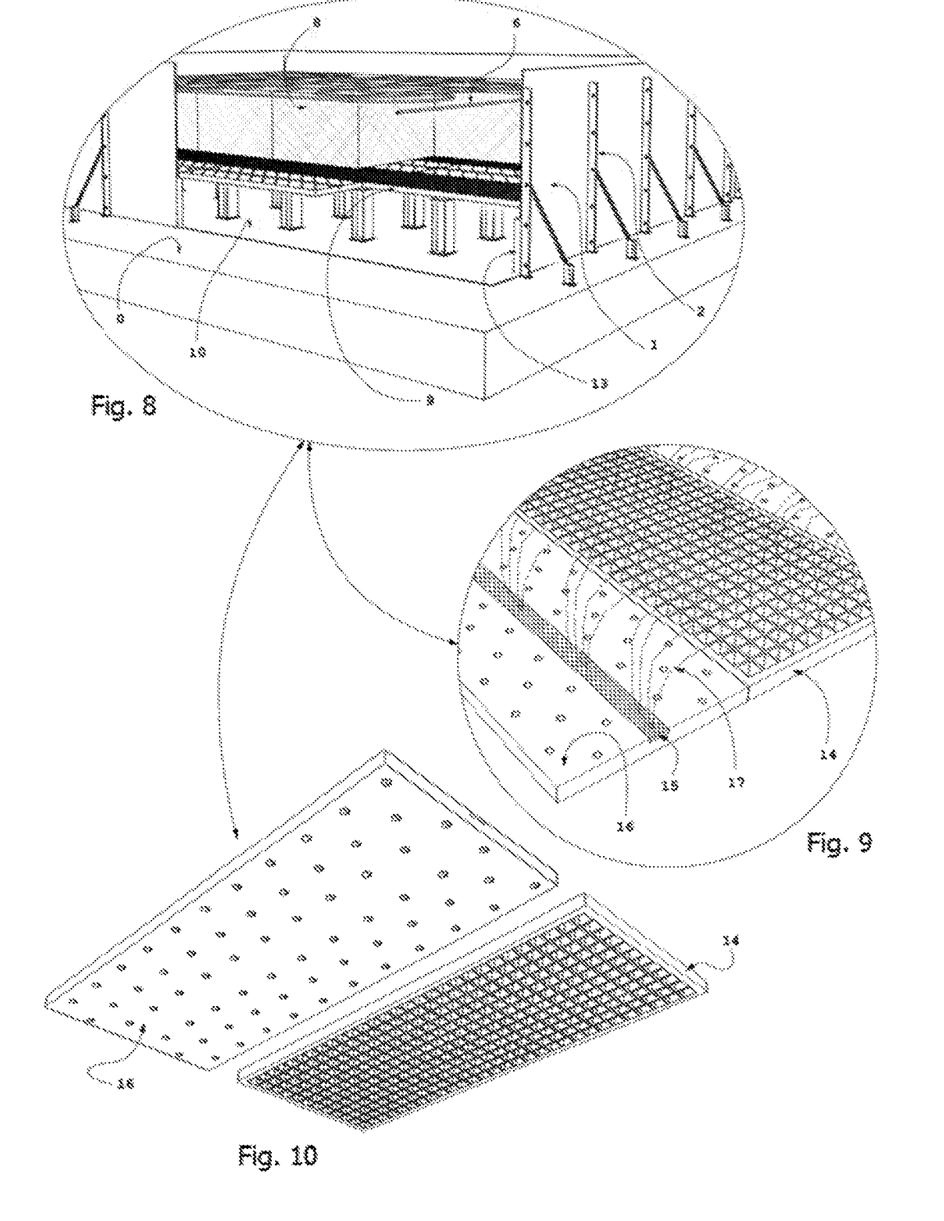
FIG. 8 depicts a side view of the support grid structure located beneath the septum according to various embodiments of the present disclosure.
FIG. 9 provides a detailed view of an electrical conductor module and a conductor strip embedded in an insulating grid, forming a capacitor-like structure for microbial stimulation and system diagnostics according to various embodiments of the present disclosure.
FIG. 10 illustrates the assembled grid structure in contact with the biofiltration substrate according to various embodiments of the present disclosure.

The fourth group of drawings in Table 4 sketches a supporting grid structure of the biofiltration septum in detail. FIGS. 8, 9, and 10 show detailed examples and the different characteristics of the specific grid modules seen from the side below. The whole apparatus, built with any material that does not interfere with the described bio-process, and of any size and shape (suitable for real applications), is characterized in that it includes:

a first terminal device (A), i.e. a feeding device, that is an element of passage and inspection including a duct (3) aimed at controlling an gaseous flow (g) inlet to be treated (g IN), its temperature (for example through the use of a temperature sensor) and the minimum and maximum flow rate (for example through the use of a flow meter), wherein:

said first terminal device (A) is an apparatus for the gaseous flow (g) entrance suitably grafted into a watertight perimeter structure (1) positioned on a smooth plane (0) using junction support (2), that is an assemblable bio-treatment module built with insulating materials and/or current and/or temperature conductive ones, and of suitable size, a buffer device (B) placed downstream to said terminal device 30 (A) and upstream of a septum of substrate biofiltration material (S), then an element aimed at receiving and passing (in it) of said gaseous flow (g) and at allowing the passage of a transiting process liquid (1) and/or in recirculation (for example an aqueous process fluid with non-antibiotic action with pH between 6 and 8.5) from said septum of biofiltration substrate material (S), which is placed between a support grid structure (9) and a pipe nozzle (6). That will allow the humidification of said bio-filtering substrate material septum (S), the washing of said gaseous flow (g), and the thermal adaptation of both the fluid flows (liquid and gaseous, for example through the use of heat exchangers), wherein:

said material of the substrate bio-filtering septum (S) consists of suitable biomass, i.e. a set of multiple bacterial communities, for example, made of non-biodegradable material or, preferably, made of wood-cellulosic material, i.e. organic/natural and biodegradable (for example roots and/or trunks and/or shredded branches and/or foliage), structured and arranged side-by-side in a multi-selective biofiltration layers/modules (7, 8), made of any material suitable for supporting a microbial biofilm (for example with an initial density of less than 350 kg/m3 and a pressure drop of less than 150 mbar/meter), with a geometrically opportune shape for the appropriate gas flow crossing, obtained with supports and/or electro-sensitive elements usable for self-diagnosis and microbial stimulation, and which includes:

an entrance refill material (r IN) and an exit waste material (r OUT), i.e. a solid by-product, wherein:

said supporting grid structure (9) is an auxiliary plane connected to the said septum of the substrate bio-filtering material (S) using perimeter support (13), which consists of grid modules (conductors and insulators), including:

an electricity conductor module (14) made of metals and resistant to corrosion and oxidation, wherein:

said electricity conductor module (14) represents a first metal plate (similar to an armature of an electric capacitor) for self-diagnosis and for stimulating microbial vitality;

an electricity conductor strip (15) made of metal, characterized by suitable thickness and width, hinged in a groove carved in an insulating grid (16) and along its entire length, where:

said electricity conductor strip (15) represents a second metal plate (similar to the armature of an electric capacitor) for self-diagnosis and microbial vitality stimulation, and wherein:

said insulating grid (16) consists of an electrically insulating material (similar to the dielectric of an electric capacitor) of suitable size and structure, which allows the passage of the lines of force subjected (imposed) to a generated and/or induced electromagnetic field (17) of any value (even of null value), suitable for stimulating and diagnosing the state of bacterial vitality on said material of said substrate bio-filtering septum (S) which is possibly made of bio-filtering material bales and packed using vertical (11) and horizontal (12) bands of ligament and/or compression (for homogenize the density and other dimensional characteristics), made of water-resistant and/or insulating material (non-conductive of electricity);

a container (C), that is an element designed to collect said process liquid (1), i.e. an incoming liquid flow to be treated (1 IN), comprising a system of pH regulation, wherein:

said container (C) is a collection tank of said process liquid (1), and wherein:

said container (C) includes an inlet element (10) for said 15 process liquid (1) entrance, placed between said smooth plane (0) and said support grid structure (9);

a control device (D) for the incoming liquid flow adduction (1 IN) and/or expulsion (1 OUT) and/or for the recirculation of said process liquid (1) in a specific pipe (for example by using of a solenoid valve), comprising at least one thermoregulation apparatus (for example a thermostat, to maintain the temperature in a specific range) and at least one flow-regulation apparatus (for the flow rate regulation in a specific range) into the said septum of substrate bio-filtering material (S), wherein:

said control device (D) is a recirculation or extraction pump (5) of said process liquid (1) and it is connected to the pipe nozzle(6);

a second terminal device (U), that is an apparatus for the gaseous flow (g) outlet, i.e. an element aimed at expelling the bio-treated gas (g OUT), wherein:

said second terminal device (U) is suitably grafted downstream and above (4) to said bio-filtering substrate (S).

The interconnect arrows of the diagram in FIG. 1 indicate (by way of example) the directions of the physical process flows and the operational links of the method.

Furthermore, said first terminal device (A) and said second terminal device (U) can also be characterized by an invertible functionality as a function of said gaseous flow (g) direction containing pollutants to be treated (then, in this case, a co-current flow between the gaseous flow and the process liquid occurs, instead of a counter flow).

Using the devices a biofiltration process will be induced, which will be integrated with self-control and feedback devices aimed at supporting the necessary bacterial vitality (using also eventual specific hardware and software for predictive diagnostics, control, and management) the process will consist of five distinct phases linked together.

Figure 2:
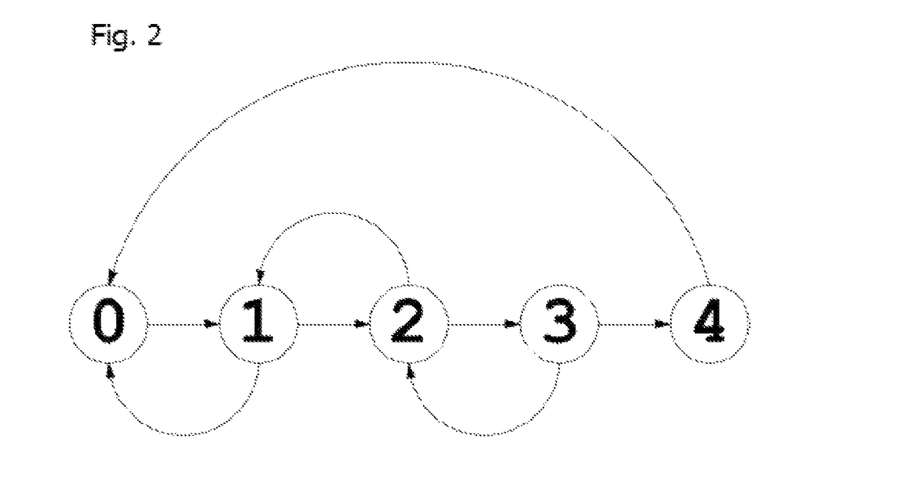
FIG. 2 is an automata diagram representing the functional logic of the biofiltration method according to various embodiments of the present disclosure.

For this purpose, such five functional process steps are represented in FIG. 2:

Phase 0—Initialization (preparation, positioning of the electrosensitive elements and the substrate biomasses) and activation phase of the said septum of biofiltration substrate material (S) of said gaseous flow (g) with said process liquid (1) and known gases (i.e. natural air), wherein:

the minimum and maximum levels of the process and output parameters are set, to allow the maintenance of the equilibrium induced by said biofiltration of the polluted gases (foreseen) to be treated at the inlet (g IN) even in case of stan-by state and/or in case of said gas flow (g) null.

Phase 1—Phase of entrance and gaseous flow (g) to be bio-treated. It is implemented using said first terminal device, (A) in the case said gaseous flow (g) and said process liquid (1) flows are in counter-flow configuration, or using said second terminal device (U) in the case said gaseous flow (g) and said process liquid (1) are in co-current flow configuration, Phase 2—Phase of regulation of the microbial habitat through the combination of all the actions of the actuators, of the electro-stimulators, and any controls eventually provided; this phase is implemented using at least one of the devices listed/described in FIG. 1 or through any combination;

Phase 3—Phase of exit of said gaseous flow (g); it is implemented using said second terminal device (U) in the case said gaseous flow (g) and said process liquid (1) are in counter-flow configuration. Conversely, it is implemented using said first terminal device (A) in the case said gaseous flow (g) and said process liquid (1) are in co-current flow configuration;

Phase 4 Phase of governance/management of the switching of pollutants; it is implemented using at least one of the devices listed/described in FIG. 1 or through any combination. The interconnect arrows making up the graph reported in FIG. 2, wherein the actions carried in Phase 0, Phase 1, Phase 2, Phase 3, and Phase 4 previously described are identified with the numbers 0, 1, 2, 3, and 4 respectively, indicate the functional links of the novel method, highlighting its peculiar feedback operations with the considered elements.

The novel method, whose functional cycle and process diagram are reported in FIG. 1 and FIG. 2 of the attached drawings, respectively, is obtained through any material and/or device, and (possibly) integrated with hardware (including data remote control) and signals from self-diagnostic devices, and/or software and/or actuator system and/or self-diagnostic devices and feedback controls (including telecommunication systems) and/or devices of any shape and geometry, with opportune interconnections to implement described execution sequence of the presented novel method, aimed at reducing pollutants and, as described above, based on assisted biofiltration.

The invention claimed is:

1. A biofiltration apparatus for treatment of at least one of gases, vapors, and flue gases, comprising:
    a first terminal device of a gaseous flow comprising a duct, wherein the first terminal device is grafted into a watertight perimeter structure positioned on a smooth plane using a junction support;
    a buffer device of the gaseous flow, placed downstream of the first terminal device and upstream of a septum of biofiltration substrate material subjected to an electromagnetic field, placed between a support grid structure and a pipe nozzle, wherein the septum of the biofiltration substrate material is made up of a plurality of biomasses structured and arranged in a multi-selective biofiltration layers, and wherein the support grid structure is connected to the septum of the biofiltration substrate material using a perimeter support, the support grid structure having a plurality of grid modules, comprising:
        an electricity conductor module;
        an electricity conducting strip positioned in a groove carved in an electrically insulating grid;
        a container for a process liquid comprising a pH regulator, wherein the container comprises an inlet element of the process liquid placed between the smooth plane and the support grid structure; and
        a control device of the process liquid comprising thermoregulation and flow-regulation apparatuses, wherein the control device is connected to the pipe nozzle;
    a second terminal device for the gaseous flow, grafted downstream and above the biofiltration substrate material.

2. The biofiltration apparatus according to claim 1, wherein:
    said first terminal device is an apparatus for entrance of the gaseous flow and the second terminal device is an apparatus for an outlet of the gaseous flow.

3. The biofiltration apparatus according to claim 1, wherein:
    the first terminal device is an apparatus for an outlet of the gaseous flow and the second terminal device is an apparatus for an entrance of the gaseous flow.

4. The biofiltration apparatus according to claim 1, wherein the septum of the biofiltration substrate material is made of a non-biodegradable material.

5. The biofiltration apparatus according to claim 1, wherein the septum of the biofiltration substrate material is made of a biodegradable material.

6. The biofiltration apparatus according to claim 1, wherein the septum of the biofiltration substrate material is made of an electric insulating material.

7. The biofiltration apparatus according to claim 1, wherein the septum of the biofiltration substrate material is made with a water-resistant material.

8. The biofiltration apparatus according to claim 1, wherein the septum of the biofiltration substrate material is packed with bands.

9. The biofiltration apparatus according to claim 8, wherein the septum of the biofiltration substrate material is packed with vertical and horizontal bands.

10. A method for a biofiltration, comprising:
    providing the biofiltration apparatus according to claim 1;

performing an initialization and an activation of the septum of the biofiltration substrate material;
performing an entrance and a control of the gaseous flow through the first terminal device;
performing regulation and management of a microbial habitat;
causing the gaseous flow to exit through the second terminal device; and
performing government and management of pollutants.

11. A method for biofiltration, comprising:
providing the biofiltration apparatus according to claim 1;
performing an initialization and an activation of the septum of the biofiltration substrate material;
introducing and controlling the gaseous flow through the second terminal device;
performing regulation and management of a microbial habitat;
causing the gaseous flow to exit through the first terminal device; and
performing government and management of pollutants.

12. A method for a biofiltration, comprising:
providing the biofiltration apparatus according to claim 2;
performing an initialization and an activation of the septum of the biofiltration substrate material;
performing an entrance and a control of the gaseous flow through the first terminal device;
performing regulation and management of a microbial habitat;
causing the gaseous flow to exit through the second terminal device; and
performing government and management of pollutants.

13. A method for biofiltration, comprising:
providing the biofiltration apparatus according to claim 3;
performing an initialization and an activation of the septum of the biofiltration substrate material;
introducing and controlling the gaseous flow through the second terminal device;
performing regulation and management of a microbial habitat;
causing the gaseous flow to exit through the first terminal device; and
performing government and management of pollutants.

14. A method, comprising:
providing a biofiltration apparatus and treating at least one of gases, vapors, and flue gases using the biofiltration apparatus, the biofiltration apparatus comprising:
a first terminal device of a gaseous flow comprising a duct, wherein the first terminal device is grafted into a watertight perimeter structure positioned on a smooth plane using a junction support;
a buffer device of the gaseous flow, placed downstream of the first terminal device and upstream of a septum of biofiltration substrate material subjected to an electromagnetic field, placed between a support grid structure and a pipe nozzle, wherein the septum of the biofiltration substrate material is made up of a plurality of biomasses structured and arranged side-by-side in a multi-selective biofiltration layers, and wherein the support grid structure is connected to the septum of the biofiltration substrate material using a perimeter support having grid modules, comprising:
an electricity conductor module;
an electricity conducting strip hinged in a groove carved in an electrically insulating grid;
a container for a process liquid comprising a pH regulator, wherein the container comprises an inlet element of the process liquid placed between the smooth plane and the support grid structure; and
a control device of the process liquid comprising thermoregulation and flow-regulation apparatuses, wherein the control device is connected to the pipe nozzle;
a second terminal device for the gaseous flow, grafted downstream and above the biofiltration substrate material.

15. The method according to claim 14, wherein treating at least one of gases, vapors, and flue gases using the biofiltration apparatus further comprises:
performing an initialization and an activation of the septum of the biofiltration substrate material;
performing an entrance and a control of the gaseous flow through the first terminal device;
performing regulation and management of a microbial habitat;
causing the gaseous flow to exit through the second terminal device; and
performing government and management of pollutants.

16. A method for biofiltration treatment of gaseous flows, comprising:
introducing a gaseous flow containing pollutants through a duct of a first terminal device into a biofiltration apparatus;
passing the gaseous flow through a buffer device positioned downstream of the first terminal device;
subjecting the gaseous flow to biofiltration by passing the gaseous flow through a septum of biofiltration substrate material, wherein the septum comprises a plurality of biomasses structured and arranged in multi-selective biofiltration layers;
applying an electromagnetic field to the septum of biofiltration substrate material using a support grid structure having a plurality of grid modules, wherein the grid modules comprise an electricity conductor module and an electricity conducting strip positioned in a groove carved in an electrically insulating grid;
circulating a process liquid through the septum of biofiltration substrate material, wherein the process liquid comprises a pH regulator and is controlled by thermoregulation and flow-regulation apparatuses;
converting pollutants in the gaseous flow into reusable compounds through biochemical oxidation by microorganisms in the biomasses; and
expelling the treated gaseous flow through a second terminal device.

17. The method of claim 16, wherein the electromagnetic field is applied using an electricity conductor module and an electricity conducting strip positioned in a groove carved in an electrically insulating grid, and wherein the method further comprises monitoring bacterial vitality by measuring electrical parameters of the electromagnetic field.

18. The method of claim 16, wherein the process liquid comprises a pH regulator maintaining a pH between 6 and 8.5, and wherein circulating the process liquid comprises controlling temperature and flow rate using thermoregulation and flow-regulation apparatuses.

19. The method of claim 16, wherein the biomasses comprise wood-cellulosic material including at least one of roots, trunks, shredded branches, and foliage, and wherein the biomasses have an initial density of less than 350 kg/m$^3$.

20. The method of claim 16, wherein the gaseous flow contains pollutants selected from the group consisting of NOx, $SO_2$, CO, $CO_2$, volatile organic compounds, dioxins, and particulate matter, and wherein the method reduces atmospheric emissions by over 90%.

* * * * *